United States Patent [19]

Isreal

[11] Patent Number: 4,802,686
[45] Date of Patent: Feb. 7, 1989

[54] TRAILER HITCH

[76] Inventor: Noah D. Isreal, 201 Kansas St., Pawnee, Okla. 74058

[21] Appl. No.: 115,535

[22] Filed: Oct. 30, 1987

[51] Int. Cl.$^4$ .............................................. B60D 1/06
[52] U.S. Cl. ................................... 280/477; 280/504; 280/511; 280/479.3
[58] Field of Search .................. 280/477, 478 B, 504, 280/506, 507, 511, 513

[56] References Cited

U.S. PATENT DOCUMENTS

| | | | |
|---|---|---|---|
| 1,745,136 | 1/1930 | Williams | 280/477 |
| 1,807,379 | 5/1931 | Burrows | 280/477 |
| 2,197,157 | 4/1940 | Reynolds | 280/33.17 |
| 2,891,237 | 6/1975 | Allen | 280/477 |
| 3,420,549 | 1/1969 | Robinson | 280/477 |
| 3,588,145 | 6/1971 | Thompson | 280/406 |
| 3,694,006 | 9/1972 | Good et al. | 280/507 |
| 3,879,062 | 4/1975 | Miller | 280/477 |
| 4,226,438 | 10/1980 | Collins | 280/477 |
| 4,360,217 | 11/1982 | Pittman | 280/513 |

Primary Examiner—David M. Mitchell
Assistant Examiner—Dom McGiehan
Attorney, Agent, or Firm—Head & Johnson

[57] ABSTRACT

A trailer hitch for connecting a trailer to a hitch ball on a towing vehicle. There are two converging sides arranged as a V which has an apex at the hitch ball receiving area. A top plate covers extends over most of the sides. There are a pair of holes in the sides which extend through the hitch ball receiving compartment. A pin with pin lock lever extends through the holes for securing the hitch ball in place.

6 Claims, 3 Drawing Sheets

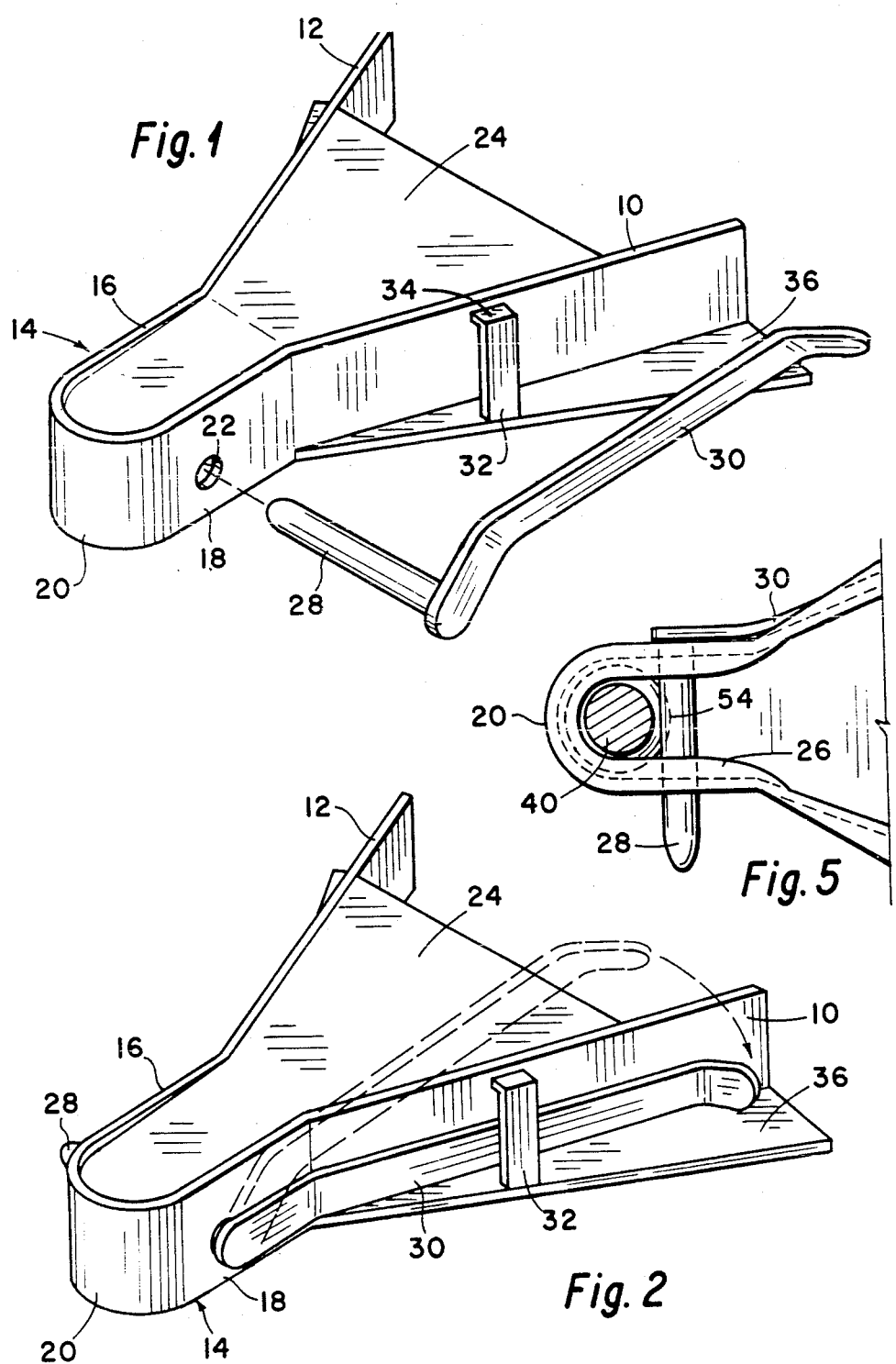

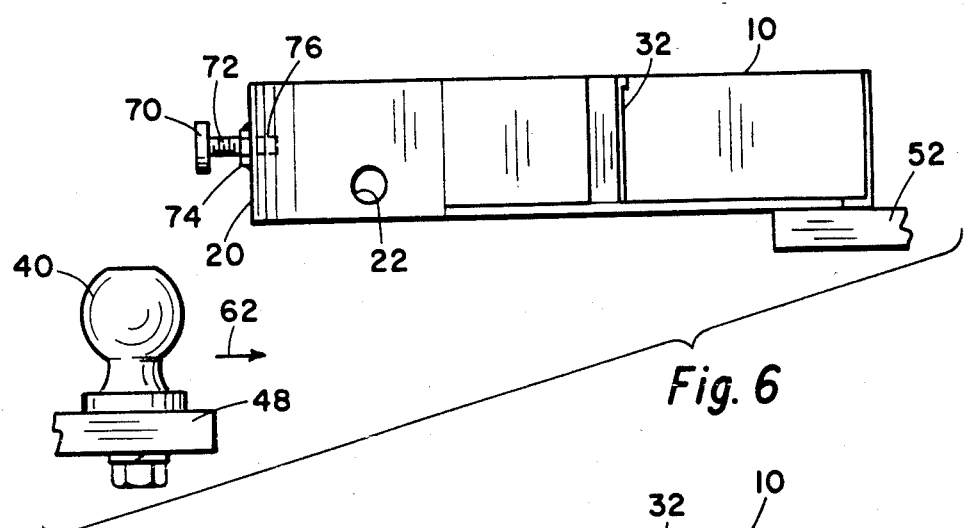
Fig. 6
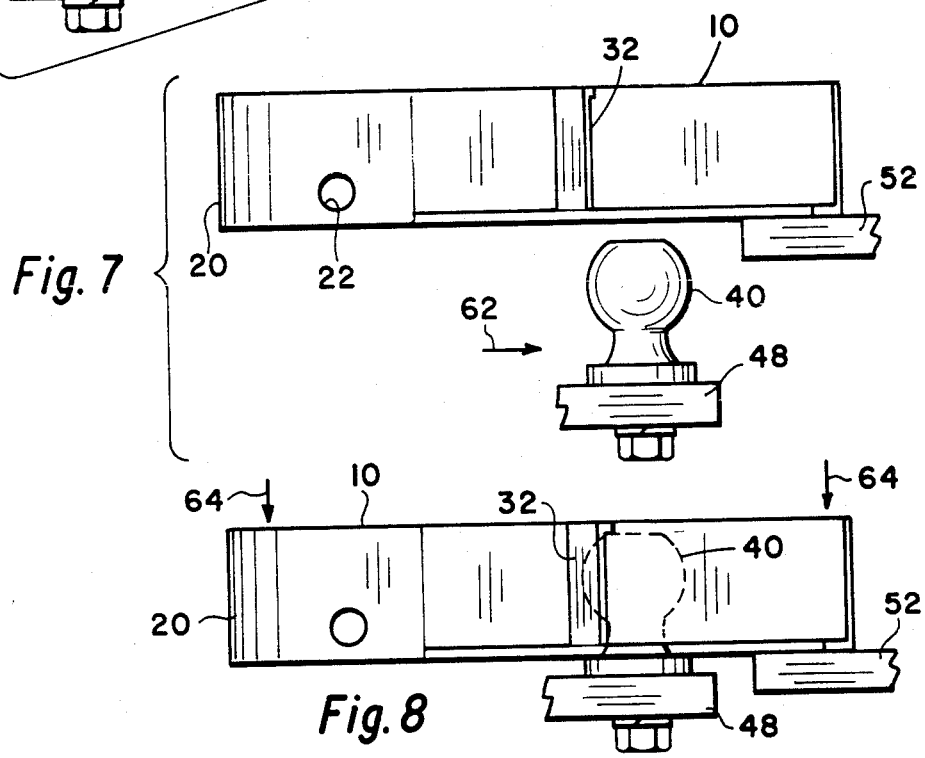
Fig. 7
Fig. 8
Fig. 9

TRAILER HITCH

BACKGROUND OF THE INVENTION

1. Field of the Invention

This invention relates to a trailer hitch to be used with a trailer hitch ball connector on the rear of motor vehicles.

2. Brief Description of the Prior Art

Vehicles such as cars and trucks which are used to pull trailers are often equipped with a permanent trailer hitch ball supported on the rear bumper or on a draft bar supported from the frame of the vehicle. A trailer hitch member is provided on the front of the trailer to be towed. The trailer hitch member may be a tongue member or other structure extending from the trailer and having an opening to receive the hitch ball.

In the prior art method when it is desired to connect the trailer hitch to the hitch ball on the towing vehicle, the trailer is jacked up to be at about the height of the hitch ball. The towing vehicle is then backed up to the point where it can engage the trailer hitch. It is difficult for the driver of the vehicle to see exactly where to back so he nearly always has an assistant to direct him. Even with the director's assistance, it is difficult to have the proper alignment. It is to be remembered that to have proper alignment there are two dimensions. That is, the hitch ball and the trailer hitch have to be aligned so that they are in the proper horizontal position. They also have to be properly aligned so that they are in the right vertical position so that the trailer hitch member can drop down over the hitch ball or at least be in a position so that it can be lowered over the hitch ball. This requires a considerable amount of alignment.

OBJECTIVES

It is therefore an object of the present invention to provide a trailer hitch which simplifies the alignment process.

It is a still further object of this invention to provide a trailer hitch which simplifies the alignment processes and also provides a unique method and means of locking the trailer hitch to the hitch ball.

SUMMARY OF THE INVENTION

This is a trailer hitch for securing a trailer to the hitch ball on the back of a towing vehicle or vice versa. A U-shaped hitch ball receiving compartment has two substantially parallel sides which are of greater height than the hitch ball. Two side members or side guards flare out from the end of the compartment. The guide members thus have a wide opening at the outer end and then converge toward the hitch ball receiving compartment at the apex of the generally V-shaped configuration. A U-shaped bottom plate is provided at the bottom side of the hitch ball receiving compartment. There are two opposite lock pin holes through the walls of the compartment. A top plate covers the compartment and extends nearly to the ends of the side guides.

A pin and pin locking lever extends through the holes in the compartment. The holes are positioned such that when the hitch ball is in the compartment that the hitch ball is between the pin and the closed end of the compartment and the pin is slightly under the hitch ball so that it cannot be removed as long as the hitch pin is in position. The bottom plate also forms a throat which is smaller than the diameter of the hitch ball. Thus, the ball cannot drop out.

There is a lever lock to hold the pin in position once it is inserted through the pin holes in the hitch ball receiving compartment.

In operation, the trailer hitch is mounted on the front of a trailer. The vehicle to tow the trailer is provided with a hitch ball. The front end of the trailer is jacked up so that the hitch ball will slide or move under the trailer hitch. The only lateral alignment which is needed is that the hitch ball is between the side guides. As soon as this occurs the towing vehicle is stopped and the front end of the trailer is lowered so that the hitch ball is within the guide area between the side guides or V-guides of the trailer hitch. Then, the next step is quite simple. The towing vehicle moves forward until the hitch ball is in the hitch ball receiving compartment. At this point, the pin is inserted through the pin holes and the latch handle is secured to the lever lock.

BRIEF DESCRIPTION OF THE DRAWINGS

FIG. 1 is a perspective view showing the pin and the pin lock lever removed from the main body of the trailer hitch.

FIG. 2 is similar to FIG. 1 except that the pin has been inserted through the pin holes and the pin lock lever is behind the lever lock.

FIG. 5 is a view taken along the line 5—5 of FIG. 4.

FIGS. 6, 7, 8 and 9 are sequence views showing how the hitch ball is secured and placed in the hitch ball compartment of the trailer hitch.

DETAILED DESCRIPTION

Figure 3:
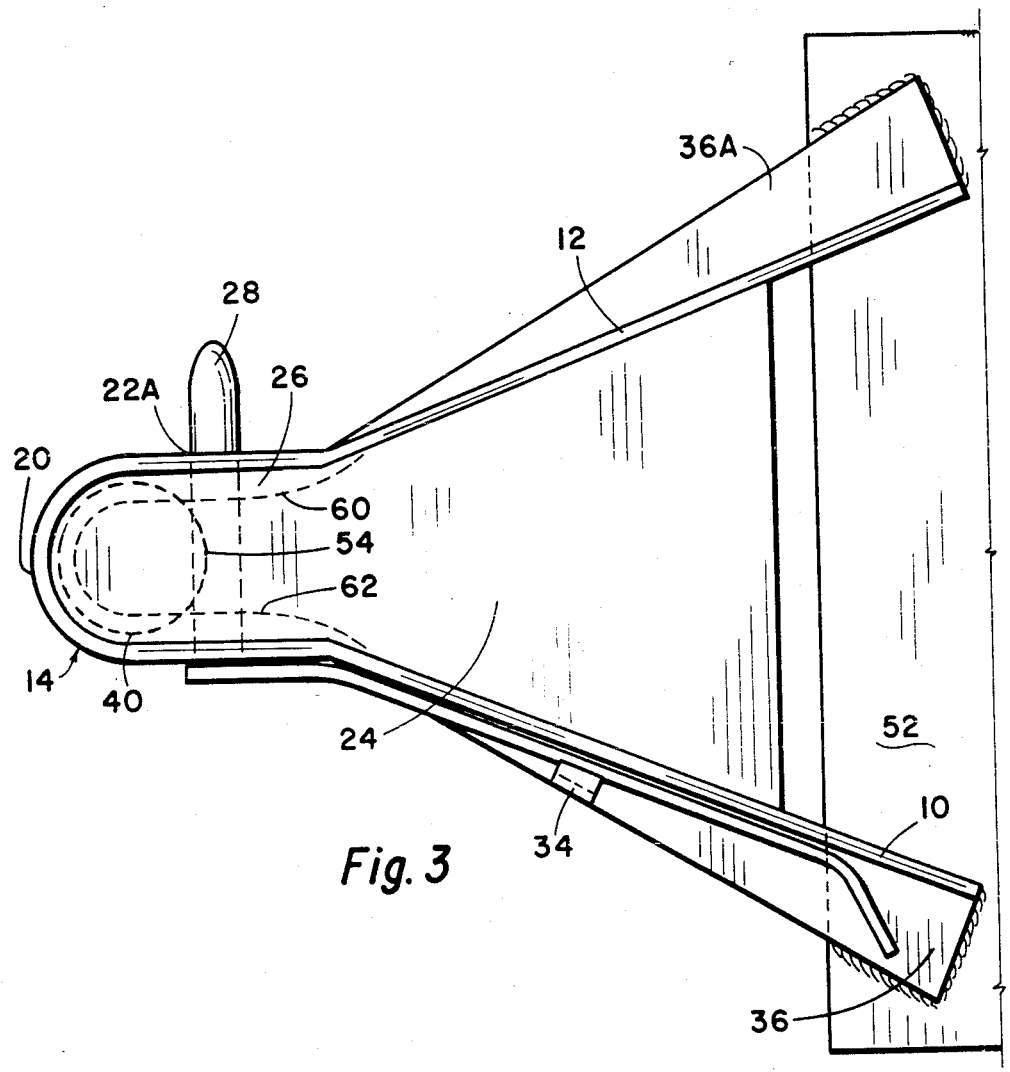
FIG. 3 is a plan view of a trailer hitch attached to frame member of a trailer.

Attention is first directed to FIG. 1 which is a perspective view of the trailer hitch of my invention. Shown thereon is a first side guide 10 and a second side guide 12. These side guides converge from a wide opening at the outer end to a hitch ball receiving compartment 14 which is essentially U-shaped having a first side 16 and a second side 18 and a curved or ball receiving apex 20. A pin hole 22 extends through side 18. A similar hole extends through side 16. A top plate 24 covers hitch ball receiving compartment 14 and extends along most of the length of side guides 10 and 12. As indicated in FIG. 3 there is a U-shaped bottom plate 26 which follows the contours of hitch ball receiving compartment 14 and allows the neck of a hitch ball to pass through.

Also shown in FIG. 1 is a pin 28 and a pin lock lever 30. A lever lock 32 having an upper lip 34 is attached to wing member 36. As shown in FIG. 3, wings 36 and 36A are welded or otherwise secured to frame 52 of a trailer (not shown) which is to be towed. As shown in FIG. 2 when pin 28 is inserted through holes 22 and the opposite hole the lever can be rotated as indicated by the dashed line and dashed arrow to where it is located behind lever lock 32.

Figure 4:
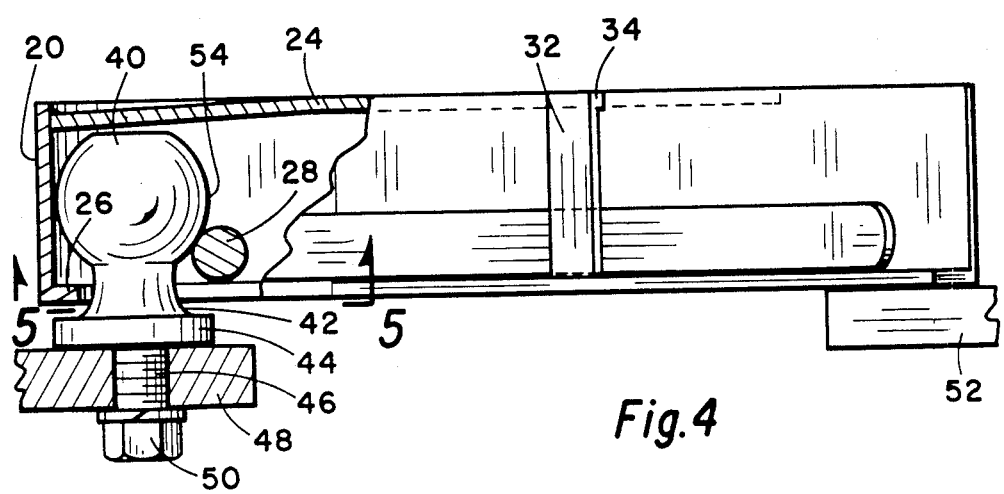
FIG. 4 is a side elevation view of the trailer hitch with a fragmentary cross section to show the positioning of the hitch ball.

Attention is next directed to FIGS. 3, 4 and 5 to show the relationship of the trailer hitch with the hitch ball. Shown in these figures is a hitch ball 40 which is connected to neck 42 to a base 44 which has a threaded bolt 46 extending downwardly therefrom. The hitch ball 40 is connected to a frame 48 or bumper as desired of the towing vehicle. This can be secured in the usual manner by, for example, nut 50 being attached to bolt 46 when it is inserted through a hole in frame 48. Ball 40 fits into apex 20 of hitch ball receiving compartment 14 so that when the hitch ball is in the position shown in these figures that it is in contact with the ball receiving apex and the pulling force between the towing vehicle and the trailer is transmitted through this area of contact. Holes 22 and 22A are positioned such that when pin 28 is inserted therethrough the pin 28 is underneath hitch ball 40 as indicated in FIG. 4. This secures the ball 40 in the proper position. As shown in FIGS. 4 and 5, pin 28 rests below point 54 of ball 40. Point 54 is a point on the circumference of ball 40 on a plane perpendicular to the axis of the ball 40 and through about the center of the hitch ball.

The material from which the trailer is made is preferably strong, high quality steel. In one trailer hitch I built the side guides 10 and 12 and the sides 18 and 16 and apex 20 of the hitch ball receiving compartment were made of three inch angle iron cut to obtain the wings members 36 and 36A. The hitch ball receiving compartment 20 was designed to receive a two inch diameter ball 40 with essentially very little tolerance; just enough so that it can move in and out of the compartment easily. The width of the bottom plate 26 inside of walls 16 and 18 was approximately one-half inch. The distance between the innermost portion of one edge 60 and inner edge 62 of bottom plate 26 is approximately one and one-quarter inches. The center of holes 22 and 22A are aligned with a line connecting the centers of holes 22 and 22A is approximately two inches from the center of apex of the hitch ball receiving compartment 14. With this arrangement I can accommodate either one and one-half inch ball a one and seven-eights ball or a two inches hitch ball. Thus, with this particular arrangement I can place the trailer hitch on a trailer and it can be used with whichever one of the three size balls which may be on the towing vehicle without changing out the hitch ball for another size such as is the case in other trailer hitches. Changing the hitch balls in the prior methods is not too big of a job unless you do not have the right size available then one would have problems.

It is believed that by now the operation of connecting the trailer hitch to a hitch ball is apparent. However, a brief description using FIGS. 6 to 9 will assist in showing the advantages of this system.

Shown in FIG. 6 is the trailer hitch ball. The trailer frame 52 is jacked up sufficiently so that the trailer hitch is at a higher elevation than the trailer hitch ball 40. While the trailer hitch is held in this elevated position the towing vehicles backs the hitch ball 40 in the direction of arrows 62. This continues until the hitch ball 40 is in the position shown in FIG. 7 where the hitch ball 40 is underneath the trailer hitch and in a lateral position so that it is directly under top plate 24, between side guide 10 and side guide 12. In FIG. 8 shows that the next step in which the trailer hitch is being lowered in the direction of arrows 64 until ball 40 is in the compartment between side guides 10 and 12 and just underneath top plate 24. At this point we have all the alignment maneuvering necessary to accomplish having the hitch ball connected to the trailer hitch. What is next done is to have the towing vehicle drive forward in the direction of arrow 66 as shown in FIG. 9. The hitch ball will be guided by the side guides 10 and 12 into the position shown in FIG. 9 where the hitch ball 40 is in its towing position within the hitch ball compartment of the trailer hitch. Neck 42 extends through the throat of bottom plate 26. At this time I insert pin 38 through holes 22 and 22A. I then insert the pin lock lever behind the lever lock 32 as shown in FIG. 2. I am now in a position to safely tow the trailer behind the towing vehicle.

Although not essential to the operation of my trailer hitch I can provide, as shown in FIG. 6, a ball adjustment nut and bolt. Shown thereon is a bolt 70 having threads 72 which is threaded through nut 74 which is welded or otherwise secured to the trailer hitch. The bolt 60 extends through the wall of compartment 20 as indicated by dotted lines 76 to adjust the ball position.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What I claim is:

1. A trailer hitch for use with a hitch ball which comprises:

an elongated hitch ball receiving compartment having first and second substantially parallel sections having upper and lower edges which sections are connected by a curved section having an upper and a lower edge, the parallel sections forming a mouth between the end of said first and second section at a position opposite the curved section;

a third and fourth section each having an upper and a lower edge and which connect to the first and second section respectively at said mouth and flare outwardly, said mouth being unobstructed so that said hitch ball may pass therethrough;

a top plate extending along the top edges of said curved section, said first and second sections and said third and fourth sections;

a U-shaped plate secured to the lower edge of said first section, said second section and said curved sections and a first hole through said first section and a second hole through said second section said U-shaped plate extending on the inner side of said first section, said second section and said curved section forming a V-shaped ledge inside thereof with a throat width which is less than the diameter of said hitch ball;

a pin lock lever having a handle and a pin in which the pin is insertable through said first and second holes.

2. A trailer hitch as defined in claim 1 including a lever lock supported from said third side for receiving the handle of said pin lock lever.

3. A trailer hitch as defined in claim 2 including a hole through the end of said curved section; a nut fixed to said curved section surrounding said hole and a bolt with a head and threadedly extending through said nut in said hole.

4. A trailer hitch for connecting to a hitch ball mounted on a towing vehicle which comprises:

a ball receiving compartment which comprises a first and a second spaced apart side members each having first and second ends, a curved section joining the ends of the first end of each said first and second side members;

a U-shaped bottom plate mounted on the bottom edge of said first side members and extending on the inner portion of the ball receiving compartment, said second side members and said curved section;

third and fourth side guide members, each side guide members having a first and second end, the guide members converging so that the first end of each said guide member is integral with the second ends of said first and second side members;

a top plate extending over said ball receiving compartment and extending between at least a portion of said third and fourth guide members.

5. A trailer hitch as defined in claim 4 including:
a first hole and a second hole through said first and second guide members;
a lock pin with a handle and a lock pin lever in which the lock pin is insertable through said first and second holes;
a lever lock supported from said third side for receiving the handle of said lock pin lever.

6. A trailer hitch for connecting a trailer to a hitch ball having a neck and connected to a towing vehicle which comprise:
  a hitch ball receiving compartment;
  a first and a second side guide member opening outwardly from the end of said hitch ball receiving compartment;
  a cover plate over said compartment and flaring outwardly to extend between said first and second side guide members;
  a first hole and a second hole through said first and second sides of said compartment;
  a lock pin lever having a handle and a lock pin which extends through said first and second holes;
  said first and second hole positioned such that when said hitch ball is in said ball receiving compartment each lock pin lever is beneath at least a part of said hitch ball;
  a lever lock attached to said second side for holding said handle in a selected locked position.

* * * * *